(12) United States Patent
Okada

(10) Patent No.: US 11,396,128 B2
(45) Date of Patent: Jul. 26, 2022

(54) STACK FORMING APPARATUS AND MANUFACTURING METHOD OF STACK FORMATION

(71) Applicant: KABUSHIKI KAISHA TOSHIBA, Minato-ku (JP)

(72) Inventor: Naotada Okada, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 638 days.

(21) Appl. No.: 16/290,216

(22) Filed: Mar. 1, 2019

(65) Prior Publication Data
US 2019/0193327 A1   Jun. 27, 2019

Related U.S. Application Data

(62) Division of application No. 14/206,048, filed on Mar. 12, 2014, now Pat. No. 10,259,159.
(Continued)

(51) Int. Cl.
| | |
|---|---|
| B29C 64/153 | (2017.01) |
| B23K 26/03 | (2006.01) |
| C23C 24/10 | (2006.01) |
| B23K 26/067 | (2006.01) |
| B23K 26/14 | (2014.01) |
| B23K 26/342 | (2014.01) |
| B23K 26/361 | (2014.01) |

(Continued)

(52) U.S. Cl.
CPC ............ *B29C 64/153* (2017.08); *B23K 26/03* (2013.01); *B23K 26/032* (2013.01); *B23K 26/0673* (2013.01); *B23K 26/1476* (2013.01); *B23K 26/342* (2015.10); *B23K 26/354* (2015.10); *B23K 26/361* (2015.10); *B29C 64/106* (2017.08); *B29C 64/135* (2017.08); *B29C 64/35* (2017.08); *C23C 24/10* (2013.01)

(58) Field of Classification Search
CPC ........................... B29C 64/188; B29C 64/268
See application file for complete search history.

(56) References Cited

U.S. PATENT DOCUMENTS 5,208,431 A    5/1993  Uchiyama et al.
5,837,960 A *  11/1998 Lewis ................ B29C 64/153
                                           219/121.63
(Continued)

FOREIGN PATENT DOCUMENTS

| CN | 101899663 | 6/2011 |
| CN | 102304712 | 1/2012 |

(Continued)

OTHER PUBLICATIONS

Office Action dated Dec. 8, 2015 in Japanese Patent Application No. 2013-223776 with English translation.
(Continued)

*Primary Examiner* — Matthew J Daniels
(74) *Attorney, Agent, or Firm* — Oblon, McClelland, Maier & Neustadt, L.L.P.

(57) ABSTRACT

A stack forming apparatus according to embodiments comprises a nozzle and a controller. The nozzle is configured to selectively inject more than one kind of material to a target and to apply laser light to the injected material to melt the material. The controller configured to control the kind and supply amount of material to be supplied to the nozzle.

5 Claims, 8 Drawing Sheets

Related U.S. Application Data

(60) Provisional application No. 61/896,301, filed on Oct. 28, 2013, provisional application No. 61/893,461, filed on Oct. 21, 2013, provisional application No. 61/892,608, filed on Oct. 18, 2013.

(51) Int. Cl.
  *B23K 26/354* (2014.01)
  *B29C 64/106* (2017.01)
  *B29C 64/35* (2017.01)
  *B29C 64/135* (2017.01)

(56) References Cited

U.S. PATENT DOCUMENTS

| | | |
|---|---|---|
| 5,993,554 A | 11/1999 | Keicher |
| 6,046,426 A | 4/2000 | Jeantette et al. |
| 6,188,482 B1 | 2/2001 | Cloud |
| 6,401,001 B1 | 6/2002 | Jang |
| 6,489,589 B1 | 12/2002 | Alexander |
| 8,124,300 B1 * | 2/2012 | Singh ............... G03F 1/32 430/5 |
| 2005/0115939 A1 | 6/2005 | Jacobs |
| 2006/0003095 A1 | 1/2006 | Bullen et al. |
| 2006/0081573 A1* | 4/2006 | Wissenbach ....... B23K 26/3576 219/121.66 |
| 2006/0114948 A1 | 6/2006 | Lo |
| 2008/0182017 A1 | 7/2008 | Singh et al. |
| 2010/0080935 A1 | 4/2010 | Brice |
| 2011/0305590 A1 | 12/2011 | Wescott et al. |
| 2012/0145683 A1 | 6/2012 | Miyagi et al. |
| 2012/0213659 A1 | 8/2012 | Bayer et al. |

FOREIGN PATENT DOCUMENTS

| | | |
|---|---|---|
| CN | 103160825 A | 6/2013 |
| DE | 10 2007 029 052 A1 | 1/2009 |
| EP | 0 666 326 B1 | 3/2001 |
| EP | 2 502 729 A1 | 3/2011 |
| JP | 5-293671 A | 11/1993 |
| JP | 2000-127251 | 5/2000 |
| JP | 2000-127251 A | 5/2000 |
| JP | 2005-152925 A | 6/2005 |
| JP | 2006-200030 | 8/2006 |
| JP | 2008-114276 A | 5/2008 |
| JP | 2009-6509 | 1/2009 |
| JP | 2011-218605 A | 11/2011 |
| JP | 2012-125772 A | 7/2012 |
| WO | WO 2012/131327 A1 | 10/2012 |
| WO | WO 2013/140147 A1 | 9/2013 |

OTHER PUBLICATIONS

Office Action dated Oct. 10, 2016 in Chinese Application No. 201480049404.8 (w/English translation).

Balu, P. P. Leggett, R. Kovacevic, Parametric study on a coaxial multi-material powder flow in laser-based powder deposition process, J. of Materials Processing Technology, vol. 212 (2012), pp. 1598-1610. (Year: 2012).

Office Action dated May 10, 2016 in Japanese Patent Application No. 2013-223776 (with English language translation).

International Search Report dated Jul. 18, 2014 from the International Searching Authority in PCT/JP2014/057942.

Written Opinion of the International Searching Authority dated Jul. 18, 2014, in PCT/JP2014/057942.

* cited by examiner

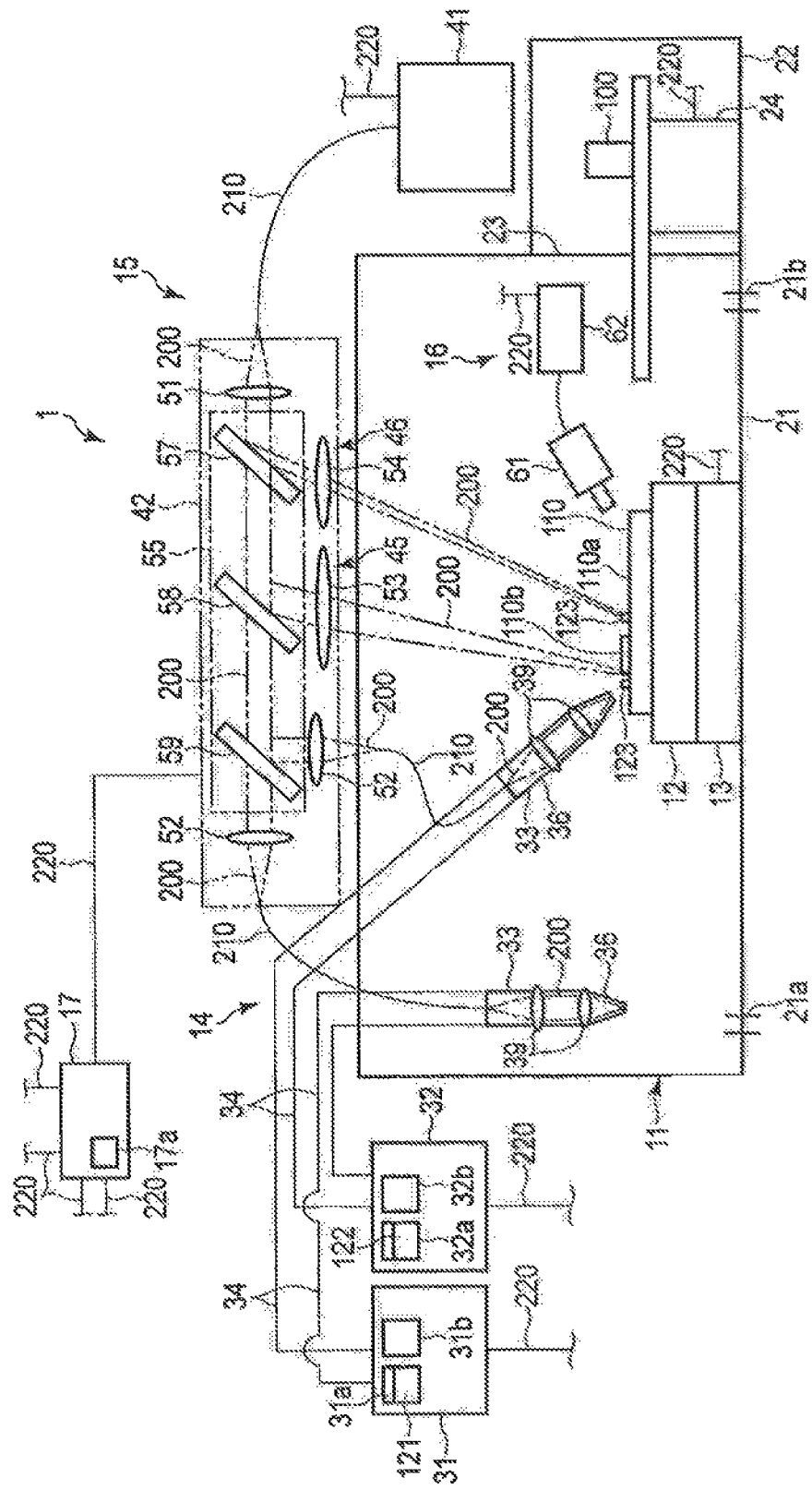
F I G. 1

STACK FORMING APPARATUS AND MANUFACTURING METHOD OF STACK FORMATION

CROSS-REFERENCE TO RELATED APPLICATIONS

This application is a divisional of application Ser. No. 14/206,048, filed Mar. 12, 2014, which claims the benefit of U.S. Provisional Application No. 61/392,603, filed Oct. 13, 2013; No. 61/893,461, filed Oct. 21, 2013; and No. 61/856,301, filed Oct. 28, 2013, the entire contents of all of which are incorporated herein by reference.

FIELD

Embodiments described herein relate to a stack forming apparatus and a manufacturing method of a stack formation.

BACKGROUND

Heretofore, a technique has been known as a method of manufacturing a stack formation. This technique repeats the step of forming a powder layer by a powder material made of a resin material or a metallic material and the step of applying, for example, light or laser light to a predetermined position of the powder layer to solidify a predetermined range of the powder layer, and stacks solidified layers to manufacture a stack formation having a three-dimensional shape.

BRIEF DESCRIPTION OF THE SEVERAL VIEWS OF THE DRAWING

FIG. 1 is an explanatory diagram schematically showing the configuration of a stack forming apparatus according to a first embodiment;

DETAILED DESCRIPTION

According to one embodiment, a stack forming apparatus includes a nozzle and a controller. The nozzle is configured to selectively inject more than one kind of material to a target and to apply laser light to the injected material to melt the material. The controller is configured to control the kind and supply amount of material to be supplied to the nozzle.

Hereinafter, a stack forming apparatus 1 and a manufacturing method of a stack formation 100 according to a first embodiment will be described with reference to FIG. 1 to FIG. 4.

Figure 2:
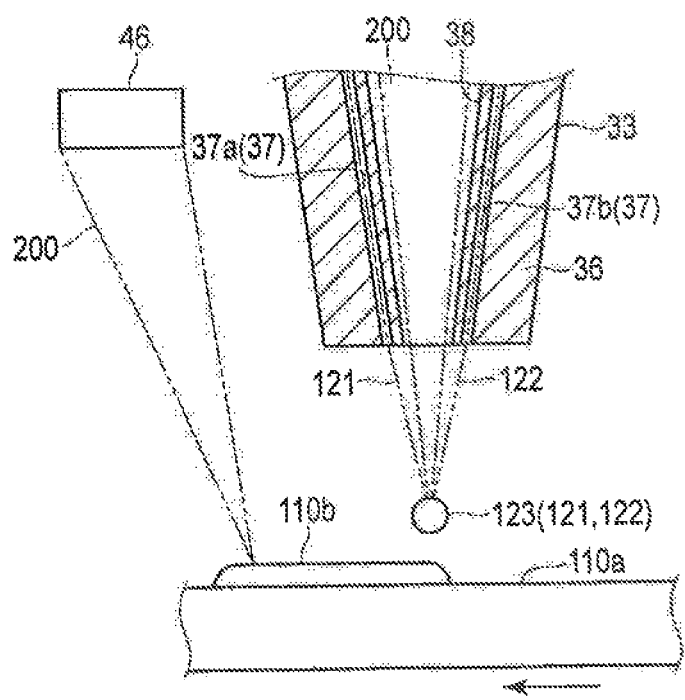
FIG. 2 is an explanatory diagram schematically showing the configurations of essential parts of the stack forming apparatus.
Figure 3:
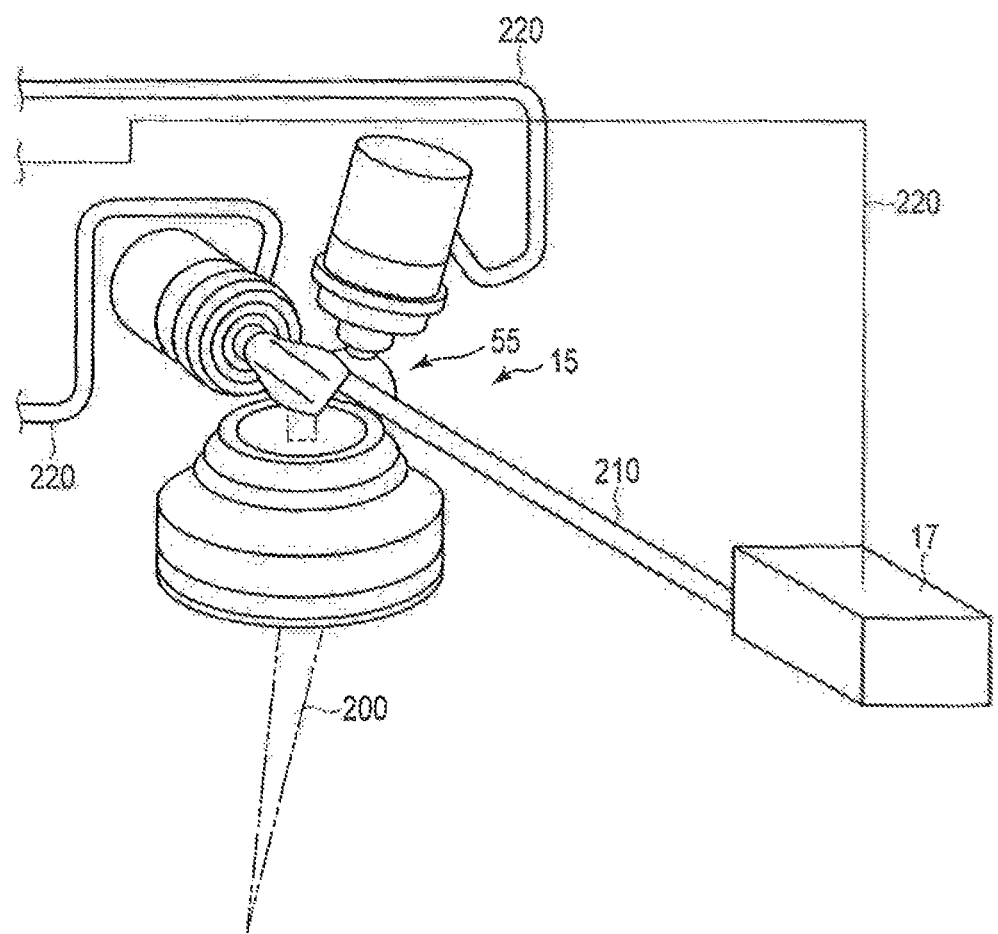
FIG. 3 is a perspective view showing the configurations of essential parts of the stack forming apparatus.
Figure 4:
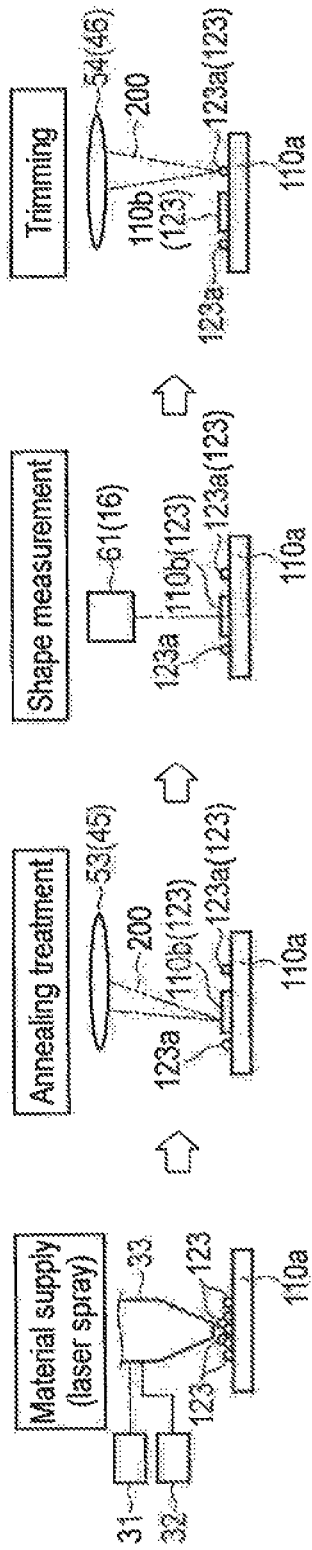
FIG. 4 is an explanatory diagram showing an example of the manufacture of a stack formation using the stack forming apparatus.

FIG. 1 is an explanatory diagram schematically showing the configuration of the stack forming apparatus 1 according to the first embodiment. FIG. 2 is an explanatory diagram schematically showing the configurations of essential parts of the stack forming apparatus 1; more specifically, the configurations of a nozzle 33 and a melting device 45. FIG. 3 is a perspective view showing the configuration of a galvano-scanner 55 of an optical device 15 used in the stack forming apparatus 1. FIG. 4 is an explanatory diagram showing an example of the manufacture of the stack formation 100 using the stack forming apparatus 1.

As shown in FIG. 1, the stack forming apparatus 1 comprises a treatment tank 11, a stage 12, a moving device 13, a nozzle device 14, the optical device 15, a measurement device 16, and a controller 17. The stack forming apparatus 1 is configured to stack layers of a material supplied by the nozzle device 14 on a target 110 provided on the stage 12, and thereby enables the stack formation 100 having a predetermined shape to be formed.

The target 110 is, for example, a base 110a having an upper surface on which the stack formation 100 is to be formed, or a layer 110b which constitutes part of the stack formation 100, and the target 110 is a target to which the material is supplied by the nozzle device 14. The material is a powder resin material or a metallic material. Different kinds of metallic materials, for example, a first material 121 and a second material 122 are used.

The treatment tank 11 comprises a main chamber 21, an auxiliary chamber 22 formed adjacent to the main chamber 21, and a door 23 which can open and shut the main chamber 21 and airtightly close the main chamber 21. The main chamber 21 is formed so that the stage 12, the moving device 13, part of the nozzle device 14, and the measurement device 16 can be disposed therein. The main chamber 21 comprises a supply hole 21a to supply inert gases such as nitrogen and argon, and a discharge hole 21b to discharge the gasses in the main chamber 21. The supply hole 21a of the main chamber 21 is connected to a supply device which supplies the inert gases. The discharge hole 21b is connected to a discharge device which discharges the gasses in the main chamber 21.

The auxiliary chamber 22 is formed adjacent to the main chamber 21. The auxiliary chamber 22 is formed so that the auxiliary chamber 22 can be spatially continuous with the main chamber 21 via the door 23. For example, the stack formation 100 treated in the main chamber 21 is conveyed to the auxiliary chamber 22. The auxiliary chamber 22 comprises a transfer device which carries, for example, the manufactured stack formation 100 and conveys the stack formation 100 from the main chamber 21, and a conveying device 24 such as a conveying arm which sucks the stack formation 100 with, for example, a vacuum head and then conveys the stack formation 100. The auxiliary chamber 22 is isolated from the main chamber 21 by the closing of the door 23 when the stack formation 100 is formed.

The stage 12 is formed so that the target 110 can be supported thereon. The moving device 13 is configured to be able to move the stage 12 in three axial directions.

The nozzle device 14 is configured to be able to selectively supply predetermined amounts of more than one kind of material to the target 110 on the stage 12, and to be able to emit laser light 200. More specifically, the nozzle device 14 comprises a first supply device 31 which can supply the first material 121, a second supply device 32 which can supply the second material 122, the nozzle 33 connected to the first supply device 31, the second supply device 32, and the optical device 15, and supply pipes 34 which connect the first supply device 31 and the nozzle 33 as well as the second supply device 32 and the nozzle 33.

For example, the first material 121 is a powder metallic material. The second material 122 is a powder metallic material different from the first material.

The first supply device 31 comprises a tank 31a to store the first material 121, and supply means 31b for supplying a predetermined amount of the first material 121 to the nozzle 33 from the tank 31a. The first supply device 31 is configured to be able to supply the first material 121 in the tank 31a to the nozzle 33 by using the inert gases of nitrogen and argon as carriers.

The second supply device 32 comprises a tank 32a to store the second material 122, and supply means 32b for supplying a predetermined amount of the second material 122 to the nozzle 33 from the tank 32a. The second supply device 32 is configured to be able to supply the second material 122 in the tank 32a to the nozzle 33 by using the inert gases of nitrogen and argon as carriers.

The nozzle 33 is connected to the first supply device 31 and the second supply device 32 via the supply pipes 34. The nozzle 33 is connected to the optical device 15 via a cable 210 which can transmit the laser light 200. The nozzle 33 is configured to be movable relative to the stage 12.

The nozzle 33 comprises a cylindrical outer envelope 36, an injection hole 37 which is provided in the outer envelope 36 and which injects the first material 121 and the second material 122 from its distal end, a light passage 38 which transmits the laser light 200, and optical lenses 39 provided in the light passage 38. For example, two nozzles 33 having the injection holes 37 different in diameter are provided. For example, the injection hole 37 of one of the nozzles 33 is formed with a diameter of 0.2 mm, and the injection hole 37 of the other nozzle 33 is formed with a diameter of 2.0 mm. The nozzles 33 are configured to be able to mix the first material 121 and the second material 122 in powder form supplied from the first supply device 31 and the second supply device 32.

The nozzles 33 are configured to be able to mix therein the first material 121 and the second material 122 in powder form supplied from the first supply device 31 and the second supply device 32, or to be able to respectively inject the first material 121 and the second material 122 from the injection holes 37 and mix the first material 121 and the second material 122 after the injection.

In the configuration described according to the present embodiment, for example, two injection holes 37 are provided, and one of the injection holes 37 is a first injection hole 37a connected to the first supply device 31 while the other is a second injection hole 37b connected to the second supply device 32. As shown in FIG. 2, for example, the injection holes 37 are formed aslant relative to the axial center of the outer envelope 36 and the optical center of the laser light 200 to be emitted so that the first material 121 and the second material 122 conveyed by the gasses supplied from the first supply device 31 and the second supply device 32 intersect with each other at a predetermined distance from the injection holes 37.

The light passage 38 is provided along the axial center of the outer envelope 36. The optical lenses 39 are provided in, for example, the light passage 38. Two optical lenses 35 are provided so that the laser light 200 from the cable 210 can be converted to parallel light and the parallel light can be converged. The optical lenses 39 are configured to most converge at a predetermined position, more specifically, at the intersection of the first material 121 and the second material 122 that are injected from the injection holes 37.

As shown in FIG. 1 and FIG. 3, the optical device 15 comprises a light source 41, and an optical system 42 connected to the light source 41 via the cable 210. The light source 41 has a transmission element, and is a supply source of the laser light 200 which is configured to be able to emit the laser light 200 from the transmission element. The light source 41 is configured to be able to change a power density of the laser light to be emitted.

The optical system 42 is configured to be able to supply the laser light 200 emitted from the light source 41 to the nozzles 33 and to apply the laser light 200 to the first material 121 and the second material 122 injected to the target 110. The optical system 42 is also configured to be able to apply the laser light 200 to the layer 110b on the base 110a and to the materials 121 and 122.

More specifically, the optical system 42 comprises a first lens 51, a second lens 52, a third lens 53, a fourth lens 54, and the galvano-scanner 55. The first lens 51, the second lens 52, the third lens 53, and the fourth lens 54 are fixed to the optical system 42. The optical system 42 may be configured to comprise an adjustment device which can move the first lens 51, the second lens 52, the third lens 53, and the fourth lens 54 in two axial directions, more specifically, in directions that intersect at right angles with or intersect with an optical path.

The first lens 51 is configured to be able to convert the laser light 200 which has been brought in via the cable 210 to parallel light and to bring the converted laser light 200 to the galvano-scanner 55. The same number of second lenses 52 as the nozzles 33 are provided. The second lens 52 is configured to be able to converge the laser light 200 emitted from the galvano-scanner 55 and to emit the laser light 200 to the nozzles 33 via the cable 210.

The third lens 53 is configured to be able to converge the laser light 200 emitted from the galvano-scanner 55 and to emit the laser light 200 to the target 110. The fourth lens 54 is configured to be able to converge the laser light 200 emitted from the galvano-scanner 55 and to emit the laser light 200 to the target 110.

The galvano-scanner 55 is configured to be able to split the parallel light converted by the first lens 51 into the second lens 52, the third lens 53, and the fourth lens 54. The galvano-scanner 55 comprises a first galvano-mirror 57, a second galvano-mirror 58, and a third galvano-mirror 59. Each of the galvano-mirrors 57, 58, and 59 is configured to be able to vary the inclination angle and split the laser light 200.

The first galvano-mirror 57 transmits some of the laser light 200 which has passed through the first lens 51 and thereby emits the laser light 200 to the second galvano-mirror 58, and reflects the remainder of the laser light 200 and thereby emits the laser light 200 to the fourth lens 54. The first galvano-mirror 57 is configured to be able to adjust, via the inclination angle thereof, the application position of the laser light 200 which has passed through the fourth lens 54.

The second galvano-mirror 58 emits some of the laser light 200 to the third galvano-mirror 59, and reflects and then emits the remainder of the laser light 200 to the third lens 53. The second galvano-mirror 58 is configured to be able to adjust, via the inclination angle thereof, the application position of the laser light 200 which has passed through the third lens 53.

The third galvano-mirror 59 emits some of the laser light 200 to one of the second lenses 52, and emits the rest of the laser light 200 to the other second lens 52.

This optical system 42 constitutes the melting device 45 which heats the first material 121 (123) and the second material 122 (123) supplied to the target 110 by the first galvano-mirror 57, the second galvano-mirror 58, and the third lens 53 to form and anneal the layer 110b. The melting device 45 uses the laser light 200 to melt the first material 121 and the second material 122 supplied onto the base 110a from the nozzles 33, and forms the layer 110b.

The optical system 42 also constitutes a removing device 46 which uses the laser light 200 supplied by the first galvano-mirror 57 and the fourth lens 54 to remove unnecessary parts formed on the base 110a and the layer 110b by the first material 121 and the second material 122.

The removing device 46 is configured to be able to remove parts of the stack formation 100 different from a predetermined shape; for example, scattered materials generated during the supply of the first material 121 and the second material 122 by the nozzles 33 or unnecessary parts generated during the formation of the layer 110b. The removing device 46 is configured to be able to emit the laser light 200 having a power density that can remove the above-mentioned parts.

The measurement device 16 is configured to be able to measure the shape of the layer 110b and the shape of the formed stack formation 100 which are the shapes of the solidified materials on the base 110a. The measurement device 16 is configured to be able to send information regarding the measured shape to the controller 17.

For example, the measurement device 16 comprises a camera 61, and an image processor 62 which performs image processing in accordance with information measured by the camera 61. The measurement device 16 is configured to be able to measure, by, for example, an interference method or a light-section method, the shapes of the layer 110b and the stack formation 100, that is, the shape of the material 123 which is the mixture of the first material 121 and the second material 122 on the base 110a.

The controller 17 is electrically connected to the moving device 13, the conveying device 24, the first supply device 31, the second supply device 32, the light source 41 the galvano-scanner 55, and the image processor 62 via a signal line 220.

The controller 17 is configured to be able to move the stage 12 in three axial directions by controlling the moving device 13. The controller 17 is configured to be able to convey the formed stack formation 100 to the auxiliary chamber 22 by controlling the conveying device 24. The controller 17 is configured to be able to adjust the supply of the first material 121 and the supply amount of the first material 121 by controlling the first supply device 31.

The controller 17 is configured to be able to adjust the supply of the second material 122 and the supply amount of the second material 122 by controlling the second supply device 32. The controller 17 is configured to be able to adjust the power density of the laser light 200 emitted from the light source 41 by controlling the light source 41. The controller 17 is configured to be able to adjust the inclination angles of the first galvano-mirror 57, the second galvano-mirror 58, and the third galvano-mirror 59 by controlling the galvano-scanner 55. The controller 17 is configured to be able to move the nozzles 33.

The controller 17 comprises a storage unit 17a. The shape of the stack formation 100 to be formed is stored in the storage unit 17a as a threshold. The ratio between the materials 121 and 122 in the layer 110b of the stack formation 100 to be formed is also stored in the storage unit 17a.

The controller 17 has the following functions (1) to (3).
(1) A function of selectively injecting the materials from the nozzles 33.
(2) A function of judging the shape of the material on the base 110a.
(3) A function of trimming the material on the base 110a.

Now, these functions (1) to (3) are described.

The function (1) is a function of selectively injecting the first material 121 and the second material 122 from the nozzles 33 in accordance with the preset ratio between the first material 121 and the second material 122 in each layer 110b of the stack formation 100 stored in the storage unit 17a. More specifically, the function (1) controls the supply means 31b and 32b of the first supply device 31 and the second supply device 32, and adjusts the ratio between the first material 121 and the second material 122 set in the predetermined layer 110b of the stack formation 100 when the layer 110b is formed. The function (1) changes the ratio between the first material 121 and the second material 122 to form a slanted material, for example, when the stack formation 100 is partly formed by different materials or at a different ratio.

In more detail, for example, when one end side of the stack formation is only formed by the first material 121 and the other end side of the stack formation is only formed by the second material 122, the first material alone is first supplied to stack the layer 110b on the base 110a and form a part which is formed by the first material 121 alone. The ratio between the first material and the second material is then changed by degrees up to the part formed by the second material 122 alone, and the ratio of the materials of the layer 110b is changed so that the ratio between the first material and the second material is fifty percent at an intermediate position between the part formed by the first material 121 alone and the part formed by the second material 122 alone. Thus, the function (1) changes the ratio between the first material 121 and the second material 122, and can thereby form a slanted material in which the ratio between the first material 121 and the second material 122 changes by degrees.

The function (2) is a function of using the measurement device 16 to measure the shape of the layer 110b or the stack formation 100 formed by the first material 121 and the second material 122 injected from the nozzles 33 on the base 110a, and comparing the shape with the threshold in the storage unit 17a to judge whether a part which is different from the predetermined shape is formed. More specifically, the first material 121 and the second material 122 are injected from the nozzles 33 by the use of the gasses and melted by the laser light 200, so that when the materials 121 and 122 are supplied onto the base 110a and the layer 110b, parts of the materials 121 and 122 may be scattered and a part which is different from the predetermined shape may be formed. The function (2) compares the shape measured by the measurement device 16 with the threshold stored in the storage unit 17a to detect the scattered materials 121 and 122, and judges whether the materials 121 and 122 are supplied to be formed into the predetermined shape. In other words, the function (2) is a function of judging whether the materials 121 and 122 are attached to the part which is different from the predetermined shape of the stack formation 100 and the stack formation 100 has a part projecting from the predetermined shape (threshold).

The function (3) is a function of removing the materials 121 and 122 having shapes different from the predetermined shape that are measured by the function (2) and thereby trimming the materials 121 and 122 supplied from the nozzles 33 into the predetermined shape. More specifically, when the materials 121 and 122 are scattered and attached to the part which is different from the predetermined shape in accordance with the function (2), the function (3) controls the light source 41 so that the laser light 200 emitted from the fourth lens 54 via the first galvano-mirror 57 has a power density that can evaporate the materials 121 and 122. The function (3) then controls the first galvano-mirror 57, and applies the laser light 200 to this part to evaporate the materials 121 and 122 and thereby trim the materials 121 and 122 into the predetermined shape.

Now, the manufacturing method of the stack formation 100 using the stack forming apparatus 1 is described with reference to FIG. 2 and FIG. 4.

First, as shown in FIG. 4, the controller 17 controls the first supply device 31 and the second supply device 32 to spray predetermined amounts of the first material 121 and the second material 122 from the nozzles 33 within a predetermined range. More specifically, the first supply device 31 and the second supply device 32 are controlled by the controller 17, and the first material 121 and/or the second material 122 in powder form are injected from the injection holes 37 at a predetermined ratio to produce a predetermined material for the layer 110b to be formed. The laser light 200 is applied to melt the injected materials 121 and 122.

Thus, as shown in FIG. 2, a predetermined amount of the melted material 123 is supplied within a range on the base 110a in which the layer 110b is to be formed. For example, when injected to the base 110a or the layer 110b, the material 123 is deformed into an aggregate of the material 123 in layer or thin film form, or cooled by the gas carrying the material 123 or cooled by heat liberation transferring the heat to the aggregate of the material 123, and stacked in granular form into a granular aggregate.

The melting device 45 is then controlled to apply the laser light 200 to the aggregate of the material 123 on the base 110a, and the aggregate of the material 123 is remelted into the layer 110b and also annealed. The measurement device 16 then measures the annealed material 123 on the base 110a. The controller 17 compares the shape of the material 123 on the base 110a measured by the measurement device 16 with the threshold stored in the storage unit 17a.

If the material 123 on the base 110a is formed into the layer 110b having the predetermined shape, the controller 17 again controls the first supply device 31 and the second supply device 32 to newly form a layer 110b on the formed layer 110b.

When the material 123 on the base 110a is attached to a position different from the predetermined shape, the controller 17 controls the removing device 46 to apply the laser light 200 to the attached material 123a and evaporate the unnecessary material 123a. Thus, the controller 17 applies the laser light 200 to the part where the shape of the material 123 measured by the measurement device 16 is different from the predetermined shape to remove the unnecessary material 123, thereby trimming the material 123 so that the layer 110b will be formed into a predetermined shape.

After the end of the trimming, the controller 17 again controls the first supply device 31 and the second supply device 32 to newly form a layer 110b on the formed layer 110b. The layers 110b are repeatedly formed and stacked in this way so that the stack formation 100 is formed.

The stack forming apparatus 1 having the above-mentioned configuration can supply the predetermined amounts of the first material 121 and/or the second material 122 to the nozzles 33 by the controller 17, and mix the first material 121 and the second material 122 by the nozzles 33 and spray the materials by the laser light 200. Thus, the materials 121 and 122 can be supplied by a predetermined ratio, and different materials can be used for the stack formation 100. The stack formation 100 will then be a slanted material.

The stack forming apparatus 1 uses the melting device 45 to remelt the material 123 (layer 110b) supplied onto the base 110a into layer form, and can remove residual stress by annealing. Moreover, the mixing of the materials 121 and 122 can be ensured, and strength can therefore be improved.

Furthermore, the stack forming apparatus 1 compares the shape of the material 123 measured by the measurement device 16 with the threshold in the storage unit 17a, and removes the unnecessarily supplied material 123, and can therefore trim in accordance with the shape of the supplied material 123. Thus, even if the material 123 is configured to be injected from the nozzles 33, the scattered and attached unnecessary material 123 can be removed, and the stack formation 100 having the predetermined shape can be formed.

As described above, the stack forming apparatus 1 according to the first embodiment can form, anneal, and trim the slanted material, and manufacture the stack formation 100 by using the materials 121 and 122 in powder form.

Second Embodiment

Figure 5:
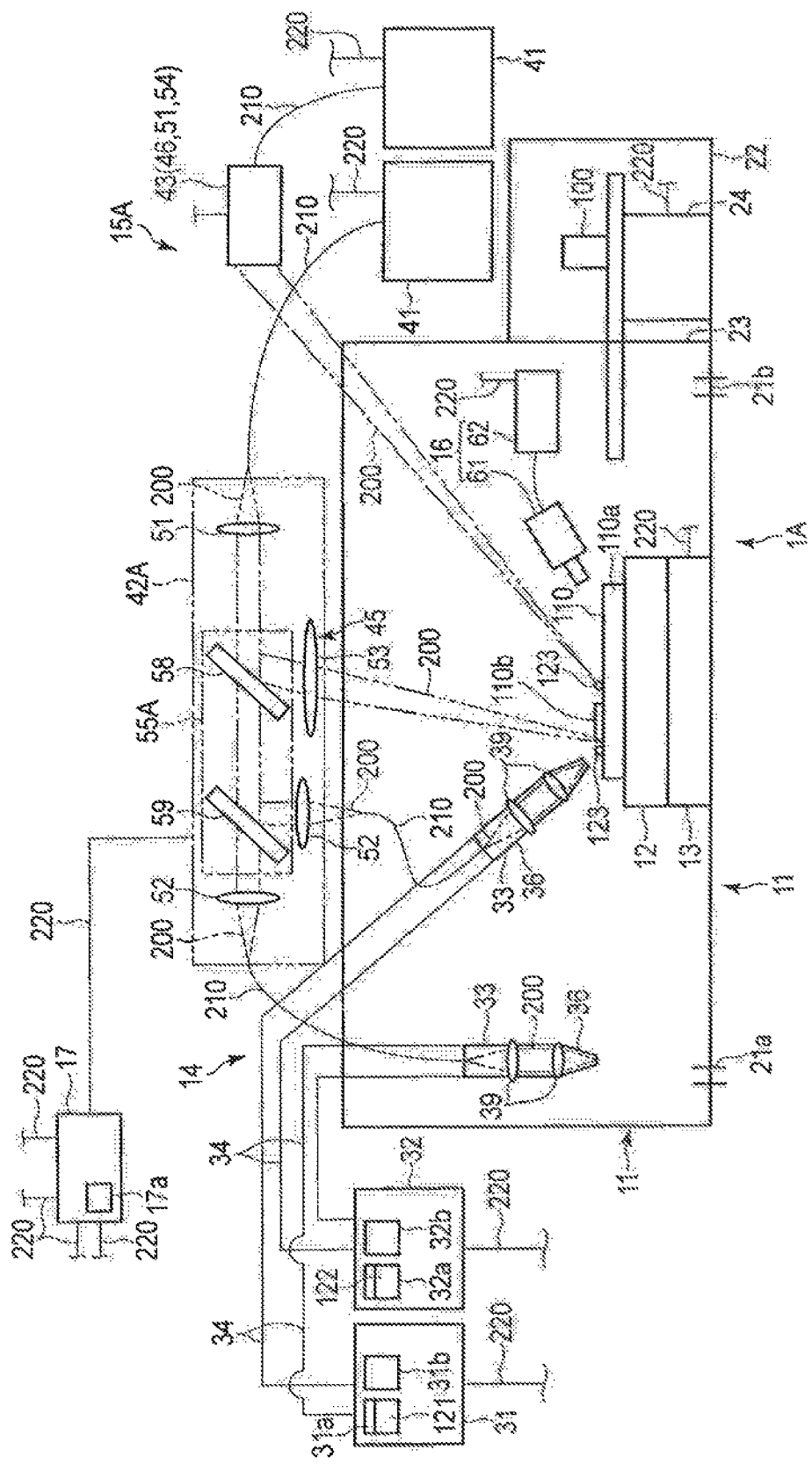
FIG. 5 is an explanatory diagram schematically showing the configuration of a stack forming apparatus according to a second embodiment.

Now, a stack forming apparatus 1A according to the second embodiment is described with reference to FIG. 5. FIG. 5 is an explanatory diagram schematically showing the configuration of the stack forming apparatus 1A according to the second embodiment. Components of the stack forming apparatus 1A according to the second embodiment that are similar to the components of the stack forming apparatus 1 according to the first embodiment described above are provided with the same reference signs and not described in detail.

As shown in FIG. 5, the stack forming apparatus 1A comprises a treatment tank 11, a stage 12, a moving device 13, a nozzle device 14, an optical device 15A, a measurement device 16, and a controller 17. The stack forming apparatus 1A is configured to stack layers of a material supplied by the nozzle device 14 on a target 110 provided on the stage 12, and thereby enables a stack formation 100 having a predetermined shape to be formed.

The optical device 15A comprises a pair of light sources 41, a first optical system 42A connected to one of the light sources 41 via the cable 210, and a second optical system 43 connected to the other light source 41 via a cable 210.

The first optical system 42A is configured to be able to supply laser light 200 emitted from the light source 41 to nozzles 33 and to apply the laser light 200 to a first material 121 and a second material 122 injected to the target 110. The second optical system 43 is configured to be able to apply the laser light 200 emitted from the light source 41 to a layer 110b on a base 110a and to the materials 121 and 122.

More specifically, the first optical system 42A comprises a first lens 51, a second lens 52, a third lens 53, and a galvano-scanner 55A. The first optical system 42A comprises an adjustment device which can move the first lens 51, the second lens 52, and the third lens 53 in two axial directions; more specifically, in directions that intersect at right angles with or intersect with an optical path.

The galvano-scanner 55A is configured to be able to split the parallel light converted by the first lens 51 into the second lens 52 and the third lens 53. The galvano-scanner 55A comprises a first galvano-mirror 53 and a second galvano-mirror 59. Each of the galvano-mirrors 58 and 59 is configured to be able to vary the inclination angle and split the laser light 200.

The first optical system 42A is configured to dispense with the fourth lens 54 and the first galvano-mirror 57 of the optical system 42 described above. This first optical system 42A constitutes a melting device 45 which uses the first galvano-mirror 58 and the third lens 53 to apply the laser light 200 to the first material 121 (123) and the second material 122 (123) supplied to the target 110, and thereby remelts the materials 121 and 122 into layer form and anneal the materials.

The second optical system 43 comprises, for example, the first lens 51 and the fourth lens 54. The second optical system 43 constitutes a removing device 46A which uses the laser light 200 supplied from the light source 41 to remove unnecessary parts formed on the base 110a and the layer 110b by the first material 121 and the second material 122. For example, the light-source 41 connected to the second optical system 43 is configured to be able to emit picosecond laser as the laser light 200. The second optical system 43 may foe configured to dispense with the galvano-scanner or configured to have the galvano-scanner.

This stack forming apparatus 1A is similar in configuration to the stack forming apparatus 1, and is configured so that the first optical system 42A including the melting device 45 of the optical device 15A is provided separately from the removing device 46A (43).

In the same manner as the stack forming apparatus 1 described above, this stack forming apparatus 1A is configured to be able to mix and inject the first material 121 and the second material 122 by the nozzles 33, and supply predetermined amounts of the first material 121 and/or the second material 122 by the controller 17. Thus, the materials 121 and 122 can be supplied at a predetermined ratio, and different materials can be used for the stack formation 100. The stack formation 100 will then be a slanted material.

The stack forming apparatus 1A uses the melting device 45 to remelt the material 123 (layer 110b) supplied onto the base 110a into layer form, and can remove residual stress by annealing. Moreover, the mixing of the materials 121 and 122 can be ensured, and strength can therefore be improved.

Furthermore, the stack forming apparatus 1A compares the shape of the material 123 measured by the measurement device 16 with a threshold in a storage unit 17a, and removes the unnecessarily supplied material 123, and can therefore trim in accordance with the shape of the supplied material 123. Thus, even if the material 123 is configured to be injected from the nozzles 33, the scattered unnecessary material 123 can be removed, and the stack formation 100 having the predetermined shape can be formed.

As described above, the stack forming apparatus 1A according to the second embodiment can form, anneal, and trim the slanted material, and manufacture the stack formation 100 by using the materials 121 and 122 in powder form.

Third Embodiment

Figure 6:
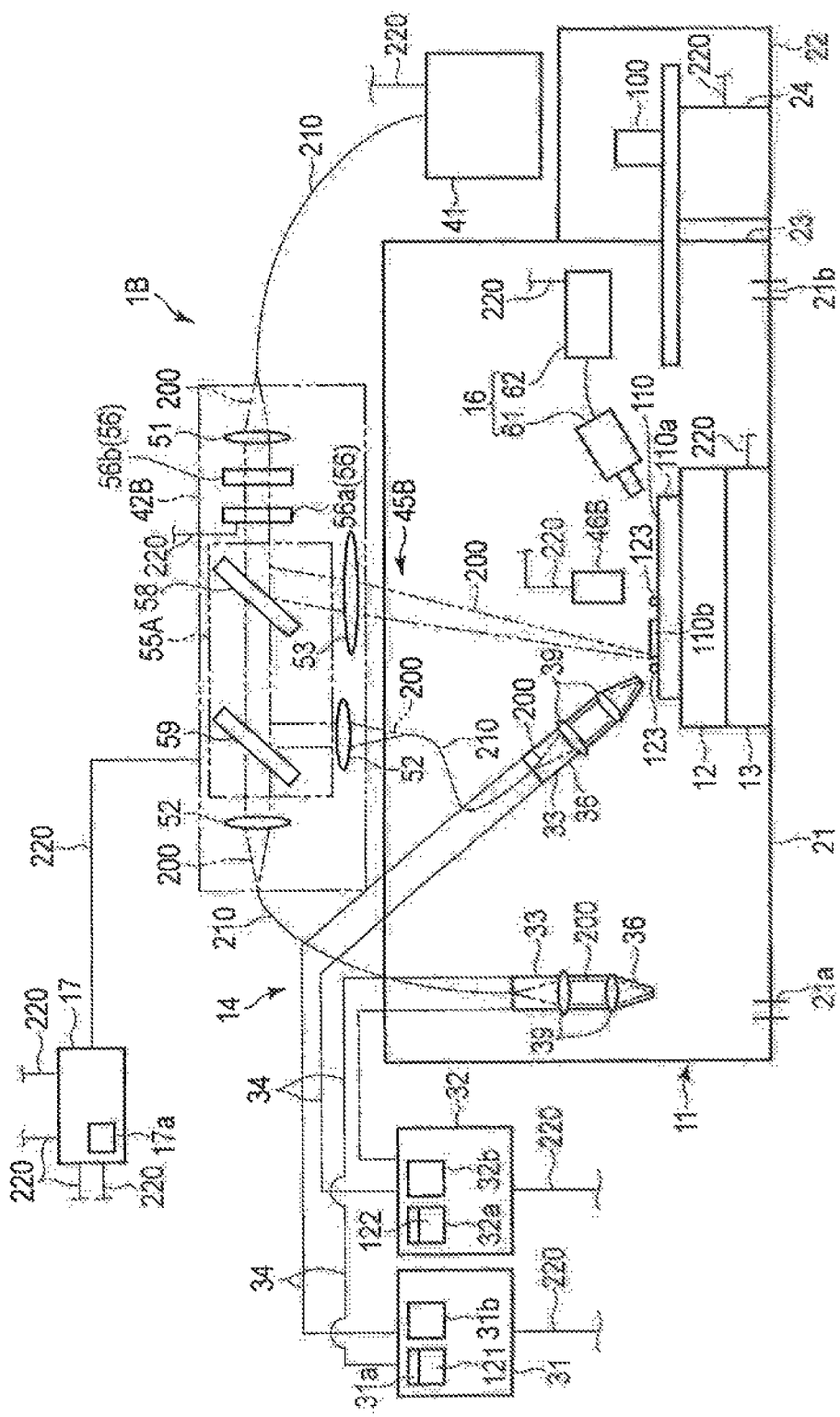
FIG. 6 is an explanatory diagram schematically showing the configuration of a stack forming apparatus according to a third embodiment.

Now, a stack forming apparatus 1B according to the third embodiment is described with reference to FIG. 6. FIG. 6 is an explanatory diagram schematically showing the configuration of the stack forming apparatus 1B according to the third embodiment. Components of the stack forming apparatus 1B according to the third embodiment that are similar to the components of the stack forming apparatus 1 according to the first embodiment and the components of the stack forming apparatus 1A according to the second embodiment described above are provided with the same reference signs and not described in detail.

As shown in FIG. 6, the stack forming apparatus 1B comprises a treatment tank 11, a stage 12, a moving device 13, a nozzle device 14, an optical device 15B, a measurement device 16, and a controller 17. The stack forming apparatus 1B also comprises a removing device 46B. The stack forming apparatus 1B is configured to stack layers of a material supplied by the nozzle device 14 on a target 110 provided on the stage 12, and thereby enables a stack formation 100 having a predetermined shape to be formed.

The optical device 15B comprises a light source 41, and an optical system 42B connected to the light source 41 via a cable 210.

The optical system 42B is configured to be able to supply laser light 200 emitted from the light source 41 to nozzles 33 and to apply the laser light 200 to a predetermined range of a first material 121 and a second material 122 injected toward the target 110.

More specifically, the optical system 42B comprises a first lens 51, a second lens 52, a third lens 53, a galvano-scanner 55A, and an application range adjustment mechanism 56 which adjusts the application range of the laser light 200. The optical system 42B comprises an adjustment device which can move the first lens 51, the second lens 52, and the third lens 53 in two axial directions, mere specifically, in directions that intersect at right angles with or intersect with an optical path. This optical system 42B is configured to be able to use the application range adjustment mechanism 56 to adjust the application range of the laser light 200 supplied to the target 110 by a first galvano-mirror 58 and the third lens 53. The optical system 42B constitutes a melting device 45B which can remelt and anneal the first material 121 (123) and the second material 122 (123) by the laser light 200 having its application range adjusted by the first lens 51, the third lens 53, the first galvano-mirror 53, and the application range adjustment mechanism 56.

The application range adjustment mechanism 56 comprises a zoom mechanism 56a which can enlarge the application range of the laser light 200, and a mask mechanism 56b which forms the application range enlarged by the zoom mechanism 56a into a predetermined shape. The zoom mechanism 56a is connected to the controller 17 via a signal line 220, and is configured to be able to enlarge the range of the laser light 200 to remelt the materials 121 and 122. When the range of the laser light 200 is enlarged, the controller 17 increases the output of the light source 41 to a power range such that the materials 121 and 122 can be melted by the laser light 200.

The mask mechanism 56b is connected to the controller 17 via the signal line 220, and is configured to be able to change the shape of the application range of the laser light 200 depending on the part of a layer 110b to which the laser light 200 is to be applied. For example, under the control of the controller 17, the mask mechanism 56b is configured to be able to change masks depending on the application position and apply the laser light 200 to an appropriate application range of the layer 110b.

The removing device 463 is, for example, a cutting device configured to be able to cut the material 123 by a cutting tool. The removing device 46B is connected to the controller 17 via the signal line 220, and is configured to be able to be movable by the controller 17.

This stack forming apparatus 1B is similar in configuration to the stack forming apparatuses 1 and 1A, and is configured to use the application range adjustment mechanism 56 to vary the application range of the laser light 200 by the melting device 45B which melts the materials 121 and 122. The stack forming apparatus 1B is also configured to cut and remove unnecessary materials by the removing device 46B.

In the same manner as the stack forming apparatuses 1 and 1A described above, this stack forming apparatus 1B is configured to be able to supply predetermined amounts of the first material 121 and/or the second material 122 by the controller 17, and mix and inject the first material 121 and the second material 122 by the nozzles 33. Thus, the materials 121 and 122 can be supplied at a predetermined ratio, and different materials can be used for the stack formation 100. The stack formation 100 will then be a slanted material.

The stack forming apparatus 1B compares the shape of the material 123 measured by the measurement device 16 with a threshold in a storage unit 17a, and can perform trimming to remove the unnecessarily supplied material 123 by the removing device 46B. Thus, even if the material 123 is configured to be injected from the nozzles 33, the scattered unnecessary material 123 can be removed, and the stack formation 100 having the predetermined shape can be formed.

The stack forming apparatus 1B uses the melting device 45B to remelt the material 123 (layer 110b) supplied onto the base 110a into layer form, and can remove residual stress by annealing. Moreover, the mixing of the materials 121 and 122 can be ensured, and strength can therefore be improved.

The stack forming apparatus 1B can adjust the application range of the laser light 200 by the application range adjustment mechanism 56 when remelting and annealing the layer 110b on the base 110a. As a result, the treatment time for the annealing can be reduced.

As described above, the stack forming apparatus 1B according to the third embodiment can form, anneal, and trim the slanted material, and manufacture the stack formation 100 by using the materials 121 and 122 in powder form.

Fourth Embodiment

Figure 7:
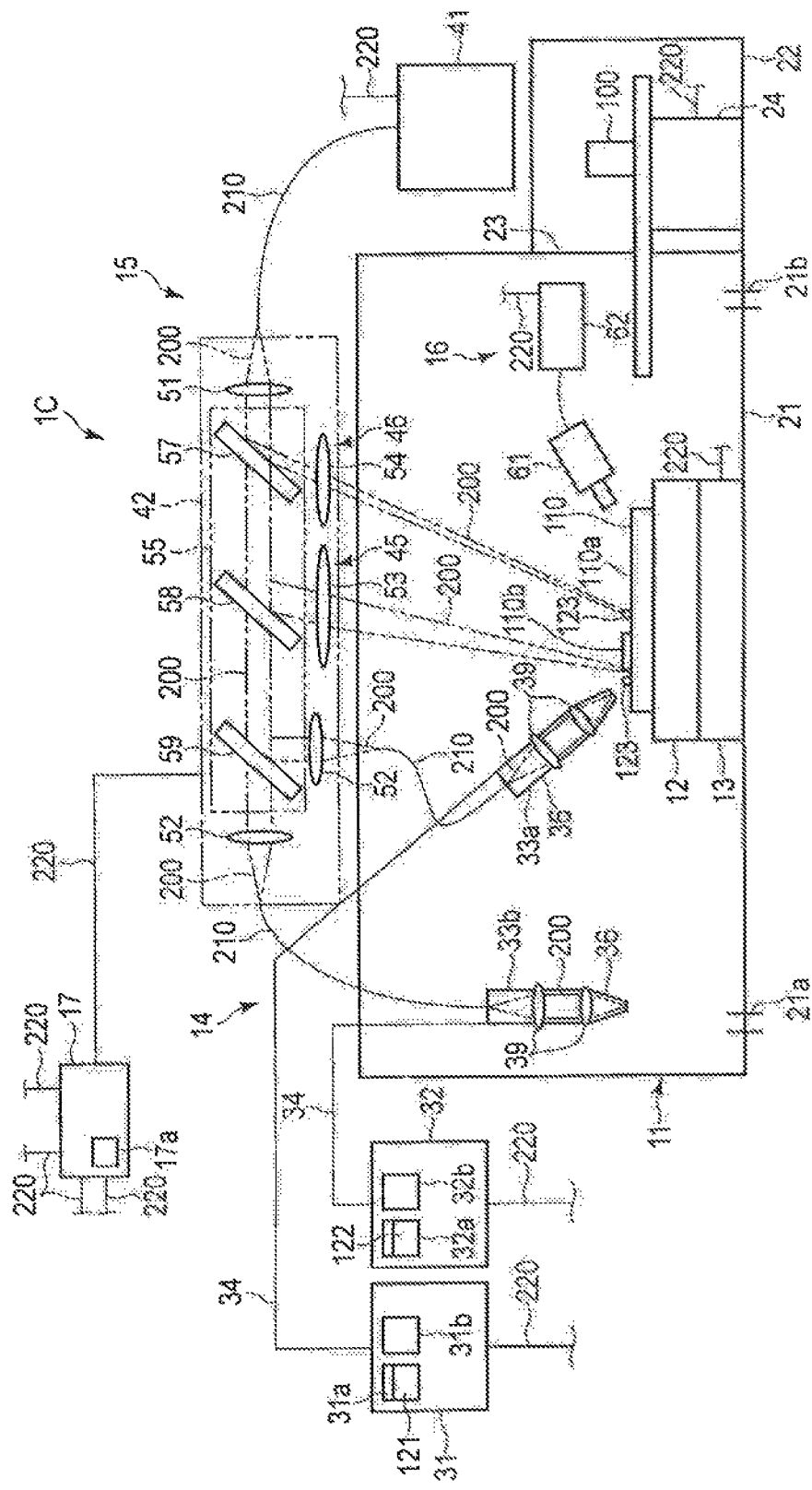
FIG. 7 is an explanatory diagram schematically showing the configuration of a stack forming apparatus according to a fourth embodiment.
Figure 8:
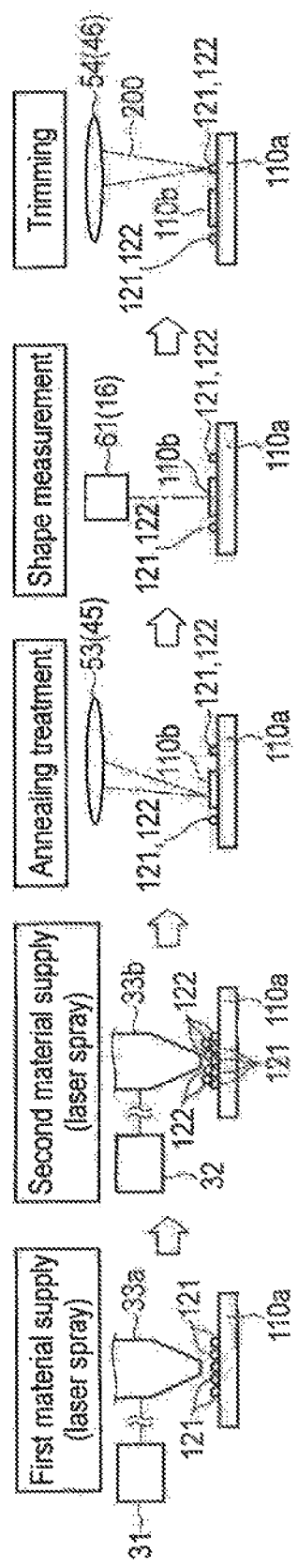
FIG. 8 is an explanatory diagram showing an example of the manufacture of a stack formation using the stack forming apparatus.

Now, a stack forming apparatus 1C according to the fourth embodiment is described with reference to FIG. 7 and FIG. 8. FIG. 7 is an explanatory diagram schematically showing the configuration of the stack forming apparatus 10 according to the fourth embodiment. FIG. 8 is an explanatory diagram showing an example of the manufacture of a stack formation 100 using the stack forming apparatus 1C. Components of the stack forming apparatus 1C according to the fourth embodiment that are similar to the components of the stack forming apparatus 1 according to the first embodiment described above are provided with the same reference signs and not described in detail.

As shown in FIG. 7, the stack forming apparatus 1C comprises a treatment tank 11, a stage 12, a moving device 13, a nozzle device 140, an optical device 15, a measurement device 16, and a controller 17.

The nozzle device 14C is configured to be able to supply predetermined amounts of materials to the target 110 on the stage 12, and to be able to emit laser light 200. More specifically, the nozzle device 14 comprises a first supply device 31 which can supply a first material 121, a second supply device 32 which can supply a second material 122, a first nozzle 33a connected to the first supply device 31 and the optical device 15, a second nozzle 33b connected to the second supply device 32 and the optical device 15, and supply pipes 34 which connect the first, supply device 31 and the first nozzle 33a as well as the second supply device 32 and the second nozzle 33b.

The first nozzle 33a and the second nozzle 33b are respectively connected to the first supply device 31 and the second supply device 32 via the supply pipes 34. These nozzles 33a and 33b are connected to the optical device 15 via a cable 210 which can transmit the laser light 200. The nozzles 33a and 33b are configured to be movable relative to the stage 12.

Each of the nozzles 33a and 33b comprises a cylindrical outer envelope 36, an injection hole 37 which is provided in the outer envelope 36 and which injects the first material 121 and the second material 122 from its distal end, a light passage 38 which transmits the laser light 200, and optical lenses 39 provided in the light, passage 38.

Now, a manufacturing method of the stack formation 100 using the stack forming apparatus 1C is described with reference to FIG. 8.

First, as shown in FIG. 8, the controller 17 controls the first supply device 31 to spray a predetermined amount of the first material 121 from the nozzle 33a within a predetermined range. More specifically, the first supply device 31 is controlled by the controller 17, and the first material 121 in powder form is injected from the injection holes 37 toward the target 110 to produce a predetermined material for the layer 110b to be formed. The laser light. 200 is applied to melt the injected first material 121.

The second supply device 32 is then controlled, and a predetermined amount of the second material 122 is injected from the nozzle 33b toward the target 110 and thus melted by the laser light 200, whereby the second material 122 is sprayed within a predetermined range.

Thus, as shown in FIG. 8, the first material 121 and the second material 122 are provided on a base 110a. More specifically, the first material 121 is attached to the base 110a, and the second material 122 is then attached to the first material 121. In other words, the first material 121 and the second material 122 are stacked on the base 110a. The laser light 200 is then applied to an aggregate of the materials 121 and 122 by a melting device 45 to remelt the aggregate of the materials 121 and 122 and thus form the layer 110b. As a result, the materials 121 and 122 are mixed to form the layer 110b, and the layer 110b is annealed. A material 123 on the base 110a annealed by remelting is then measured by the measurement device 16. The controller 17 compares the shape of the material 123 on the base 110a measured by the measurement device 16 with the threshold stored in the storage unit 17a.

If the material 123 on the base 110a is formed into the layer 110b having the predetermined shape, the controller 17 again controls the first supply device 31 to supply the first material 121, and then controls the second supply device 32 to supply the second material 122. The melting device 45 is then controlled to remelt and then anneal the materials 121 and 122, and a layer 110b is newly formed on the layer 110b.

When the material 123 on the base 110a is attached to a position different from the predetermined shape, the controller 17 controls a removing device 46 to apply the laser light 200 to the attached material 123 and evaporate the attached material 123. Thus, the controller 17 applies the laser light 200 to and thereby trims the part where the shape of the material 123 measured by the measurement device 16 is different from the predetermined shape.

After the end of the trimming, the controller 17 again controls the first supply device 31 and the second supply device 32 to newly form a layer 110b on the formed layer 110b. The layers 110b are repeatedly formed and stacked in this way so that the stack formation 100 is formed.

The stack forming apparatus 1C having the above-mentioned configuration can form, anneal, and trim the slanted material, and manufacture the stack formation 100 by using the materials 121 and 122 in powder form, as in the first embodiment described above.

The stack forming apparatuses 1, 1A, 1B, and 1C according to the embodiments are not limited to the configurations described above. For example, each of the stack forming apparatuses 1, 1A, 1B, and 1C is configured to comprise the treatment tank 11 having the main chamber 21 and the auxiliary chamber 22 in the examples described above, but is not limited to this configuration. For example, the treatment tank 11 may be configured to have the main chamber 21 alone, or may be configured to have an auxiliary chamber which does not have the conveying device 24. However, when the treatment tank 11 is configured to use the auxiliary chamber 22, the atmosphere in the main chamber 21 can be maintained, and it is easier to continue operation in the main chamber 21 and the auxiliary chamber 22. When the stack formation 100 is configured to be conveyed to the auxiliary chamber 22, the material injected from the nozzles 33 in the main chamber 21 and thus airborne in the main chamber 21 do not easily escape from the chamber. This, it is preferable that the treatment tank 11 is configured to have the auxiliary chamber 22 adjacent to the main chamber 21.

In the examples described above, the optical device 15 comprises the melting device 45 which remelts the materials 121 and 122 supplied from the nozzles 33 to form the layer 110b and anneals the materials. However, this is not a limitation. For example, the stack forming apparatus may be configured to form the layer 110b not by melting but by sintering and annealing the layer 110b.

In the examples described above, the measurement device 16 is configured to comprise the camera 61, and the image processor 62 which performs image processing in accordance with the information measured by the camera 61. However, this is not a limitation. The measurement device 16 may have any other configuration that can measure the shape of the material supplied onto the base 110a.

In the examples described above, the stack forming apparatus 1 is configured so that the nozzles 33 and the stage 12 are movable. However, this is not a limitation. The stack forming apparatus may be configured so that the nozzles 33 alone or the stage 12 alone is movable.

In the examples described above, two nozzles 33 having the injection holes 37 different in diameter are provided. However, this is not a limitation. More than two nozzles 33 may be provided. When more than one nozzle 33 is provided, the most efficient nozzle 33 can be used depending on the area and shape to which the material is to be injected, and the stack formation 100 can be efficiently formed.

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A manufacturing method of a stack formation, the method comprising:
    setting a first ratio for a first nozzle and generating a first mixed material by mixing a first material and a second material at the first ratio, the second material being a different kind of material from the first material;
    applying the first mixed material to the first nozzle at the first ratio;
    injecting the first mixed material to a target from the first nozzle;
    applying laser light from the first nozzle to the first mixed material to melt the first mixed material;
    setting a second ratio for a second nozzle and generating a second mixed material by mixing the first material and the second material at the second ratio different from the first ratio;
    applying the second mixed material to the second nozzle at the second ratio;
    injecting the second mixed material to the target from the second nozzle;
    applying laser light from the second nozzle to the second mixed material to melt the second mixed material;
    remelting the first mixed material and the second mixed material on the target to form a layer; and
    independently chancing the first ratio and the second ratio between the first material and the second material in the first nozzle and the second nozzle to add a layer on the layer formed on the target.

2. The manufacturing method of the stack formation according to claim 1, wherein the second mixed material is attached to the first mixed material on the target.

3. The manufacturing method of the stack formation according to claim 1, further comprising:
    measuring, by a measurement device, the shapes of the first mixed material and the second mixed material on the target; and
    partly removing the first mixed material and the second mixed material on the target in accordance with a measurement result by the measurement device.

4. The manufacturing method of the stack formation according to claim 3, further comprising:
    comparing the shape measured by the measurement device with a threshold which is stored in a storage unit by a controller and which is the shape of a stack formation to be formed on the target; and
    comparing the shape measured by the measurement device with the threshold, and partly removing the first mixed material and the second mixed material on the target when a part of the shape is different from the threshold.

5. The manufacturing method of the stack formation according to claim 1, wherein the first material and the second material are mixed before injected from the first nozzle and the second nozzle.

* * * * *